United States Patent
Keng

(10) Patent No.: US 8,196,504 B2
(45) Date of Patent: Jun. 12, 2012

(54) TRIPOD MOUNT AND CLAMP ASSEMBLY

(75) Inventor: Da Keng, Smyrna, GA (US)

(73) Assignee: Keng's Firearms Specialty, Inc., Atlanta, GA (US)

( * ) Notice: Subject to any disclaimer, the term of this patent is extended or adjusted under 35 U.S.C. 154(b) by 257 days.

(21) Appl. No.: 12/686,936

(22) Filed: Jan. 13, 2010

(65) Prior Publication Data

US 2010/0218670 A1    Sep. 2, 2010

Related U.S. Application Data

(60) Provisional application No. 61/193,960, filed on Jan. 13, 2009.

(51) Int. Cl.
*F41A 23/14* (2006.01)

(52) U.S. Cl. ............... 89/37.04; 89/37.01; 89/40.06; 73/167; 189/203

(58) Field of Classification Search ............ 189/203; 89/40.06, 37.04, 37.01; 73/167

See application file for complete search history.

(56) References Cited

U.S. PATENT DOCUMENTS

| | | | | |
|---|---|---|---|---|
| 2,575,805 A * | 11/1951 | Glassey | ............... | 89/40.06 |
| 3,233,517 A * | 2/1966 | Morrison | ............... | 89/40.06 |
| 4,848,238 A * | 7/1989 | Bocker et al. | ............... | 102/476 |
| 5,711,103 A * | 1/1998 | Keng | ............... | 42/94 |
| 6,044,747 A * | 4/2000 | Felts | ............... | 89/40.06 |
| 6,272,785 B1 * | 8/2001 | Mika et al. | ............... | 42/94 |
| 7,281,347 B2 * | 10/2007 | Carpenter | ............... | 42/94 |
| 7,401,431 B2 * | 7/2008 | Pierce et al. | ............... | 42/94 |
| 7,584,568 B1 * | 9/2009 | Brownlee | ............... | 42/94 |
| 7,934,445 B2 * | 5/2011 | McClellan | ............... | 89/40.06 |
| 7,992,339 B2 * | 8/2011 | Hinds, Jr. | ............... | 42/94 |
| 8,104,214 B2 * | 1/2012 | Boord | ............... | 42/94 |
| 2006/0260460 A1 * | 11/2006 | Plumier et al. | ............... | 89/37.01 |
| 2006/0278797 A1 * | 12/2006 | Keng et al. | ............... | 248/440.1 |
| 2007/0051235 A1 * | 3/2007 | Hawkes et al. | ............... | 89/37.04 |
| 2009/0126250 A1 * | 5/2009 | Keng | ............... | 42/94 |
| 2010/0218411 A1 * | 9/2010 | Keng | ............... | 42/94 |
| 2011/0126444 A1 * | 6/2011 | Keng et al. | ............... | 42/94 |

* cited by examiner

*Primary Examiner* — Michael David
(74) *Attorney, Agent, or Firm* — Rodgers & Rodgers

(57) ABSTRACT

A tripod assembly having multiple interchangeable accessories for use in supporting a firearm or other device includes mounting couplers for releasably securing the assembly to an attachment point on a device to be supported, such as the forearm of a rifle, mounting brackets that are not affixed to the device to be supported, and threaded fasteners adapted for connection to standard threaded sockets for supporting devices such as cameras, spotting scopes and the like. The tripod assembly has a substantially planar, generally triangular tripod base including three sides terminating in, and defining, first, second and third vertices carrying respective first, second and third telescoping support legs.

10 Claims, 12 Drawing Sheets

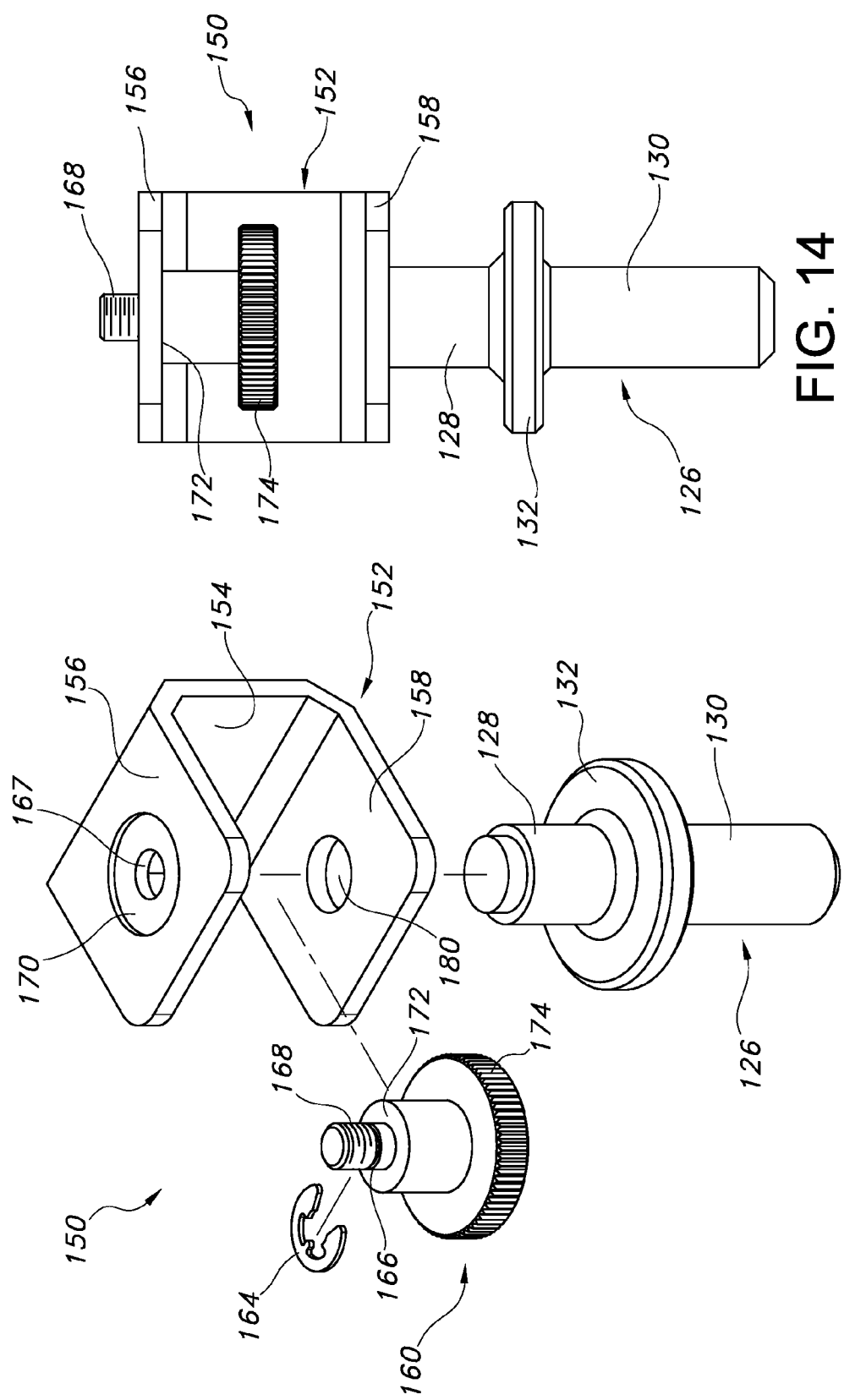

TRIPOD MOUNT AND CLAMP ASSEMBLY

RELATED PATENT AND PENDING PATENT APPLICATION INFORMATION

This application claims the benefit of U.S. Provisional Application No. 61/193,960, filed Jan. 13, 2009, the entire disclosure of which is hereby incorporated herein by reference, and is owned by the applicant/owner of U.S. Pat. Nos. 5,711,103, 5,815,974, and 7,631,455, the entire disclosures of which are hereby incorporated herein by reference.

FIELD OF THE INVENTION

The present invention relates, in general, to a method of supporting a device such as a firearm on a surface for steadying the supported device, and to support devices such as table top supports. More particularly, the invention relates to an apparatus useful as a firearm support accessory and to a method of supporting a firearm. In one form of the invention, a clamp assembly is utilized to attach the firearm support accessory to a mounting structure that is affixed to the forearm stock of a firearm. The clamp assembly is removably secured to the mounting structure and enables quick attachment and detachment of the support accessory to the firearm without modification of the mounting structure or of the forearm stock of the firearm.

BACKGROUND OF THE INVENTION

When shooting firearms, especially in stressful situations, it is important that the firearm be maintained in a steady, stable position to insure accuracy of aim. Most shooters are not able to hold a firearm consistently in a set position without wavering, especially after the onset of fatigue resulting from strain on the shooter due to the size and weight of the firearm. Accordingly, peripheral support devices have long been used with firearms as a means of stabilizing them to reduce vibration, wavering, etc., and to improve accuracy.

In the past, shooters have used everything from large stationary objects such as rocks and tree branches to forked sticks, shooting slings, bipods and tripods. Early bipod and tripod supports typically were somewhat crude stands that generally were bulky, inconvenient and difficult to use and typically were not easily adjustable. In more recent times, bipod supports have been developed that are compact and relatively lightweight and are mountable to the forearm stock of a firearm, such as a rifle, to make the bipod portable with the firearm. Most conventional bipod supports include a pair of legs that can be pivoted from an up position, adjacent the firearm stock, to a down position engaging a support surface, with the legs also being extensible to adjust the height of the support.

Problems sometimes noted with conventional bipods include stability and the ability of the bipod to mount to most firearms without requiring the use of special mounting tools. Machining or modification of the firearm stock to accommodate the bipod is undesirable, for most users. Additionally, most supports are not designed for quick and easy attachment and release from the firearm stock.

For example, U.S. Pat. No. 5,194,678 discloses a bipod assembly that includes legs that are pivotable independently of one another for ease of adjustment, but which does not solve the stability problem and is not easily attached and detached from the firearm. Other types of conventional bipods offer varying types of mountings that can be fitted to various types of rifles without requiring modification or machining of the rifle stock. For example, Harris Engineering, Inc. manufactures a series of bipod mounts for use with a variety of different firearms. However, these bipod mounts do not enable quickly releasing an attached support from the firearm.

One of the most popular bipods on the market has been the Parker-Hale bipod assembly. This bipod assembly includes a pair of telescoping legs attached to a mounting frame, and a mounting block for mounting the bipod to the firearm. The mounting block of this device is releasably attached to the mounting frame of the bipod assembly to enable quick attachment and release of the legs of the bipod from the firearm. The problem with the Parker-Hale bipod is that to mount the bipod assembly to a firearm, the forearm stock of the firearm generally must be modified to mount a track or slide therein, along which the mounting block is received to mount the bipod to the firearm. Such a modification generally is expensive, often must be done by a specialty gunsmith, and if not done with great care, can mar the finish of the firearm.

Accordingly, it can be seen that a need exists for a mounting device for selectively attaching an accessory such as a support attachment to a firearm, as when the shooter may desire to have a stable support for precision aiming. Ideally, the mounting device should not require extensive modification of the firearm, such as machining of the forearm stock of the firearm, and preferably should also enable quick and easy attachment and detachment of the accessory to the firearm. The mounting device should enable the connection of a support attachment to the firearm that will minimize the risks associated with instability such as falling or a leaning moment of inertia, as can occur when a rifle barrel incorporates a bottom mount that is used to support a bipod assembly.

SUMMARY OF THE INVENTION

The present invention comprises a tripod assembly having multiple interchangeable accessories for use in supporting a firearm or other device for which a stable mount is desired. The accessories include mounting couplers for releasably securing the assembly to an attachment point on a device to be supported, such as the forearm of a rifle, mounting brackets that are not affixed to the device to be supported, and threaded fasteners adapted for connection to standard threaded sockets for supporting devices fitted with such sockets, such as cameras, spotting scopes and the like.

Briefly, the invention comprises a collapsible tripod assembly having a substantially planar, generally triangular tripod base including three sides terminating in, and defining, first, second and third corners, or vertices carrying respective first, second and third telescoping support legs, each of the support legs having a proximal end hingedly attached to the planar base at a corresponding one of the vertices. Each of the hinged legs is configured for manual movement between a first, or deployed, downwardly projecting position, wherein the leg extends away from the plane of the tripod base for supporting the base, and a second, or folded position, wherein the leg is substantially parallel to and aligned with the plane of the base.

The planar tripod base includes a central aperture for receiving a mount coupling member that will secure any one of a plurality of support accessories which may be in the form of kits including components for assembling a selected mount assembly. One embodiment of such a kit may include a cushion support, or "bench rest" mount that may be affixed to the top surface of the tripod base plate. Another embodiment of such a mount assembly kit may incorporate an industry—standard camera-style mount incorporating a threaded shaft for engaging a correspondingly threaded bore on a device to be supported. Still another embodiment may incorporate a Versa-Pod® style support, which is commonly used on firearms, that includes a clamp to enable the tripod assembly to be affixed to a corresponding pin, or spigot mount, as described in applicant's U.S. Pat. Nos. 5,711,103 and 5,815,974, secured to the device to be supported.

In use, the telescoping legs of the tripod assembly of the present invention can be retracted and pivoted to a horizontal, non-supportive, or folded position or can be deployed into a substantially vertical, supporting position, with the telescoping legs optionally extended as needed to adjust the height of the tripod support. With the optional Versa-Pod® style clamp assembly securely mounted to the tripod assembly, a Versa-Pod® mount equipped device or instrument, such as the forearm stock of a firearm, can engage and be securely supported and stabilized by the tripod assembly. Similarly, the optional camera style mount can be secured to the tripod and to a device to be supported, or a cushion support can be affixed to the tripod assembly to provide a secure and stable bench rest for a device such as a spotting scope or a firearm.

BRIEF DESCRIPTION OF THE DRAWINGS

Various objects, features and advantages of the present invention will become apparent to one skilled in the art upon a review of the following specification, when taken in conjunction with the accompanying drawings, in which:

FIG. 13 is an exploded view of the accessory of FIG. 12;

FIG. 14 is a side plan view of the accessory of FIG. 12;

DETAILED DESCRIPTION OF A PREFERRED EMBODIMENT

Figure 1:
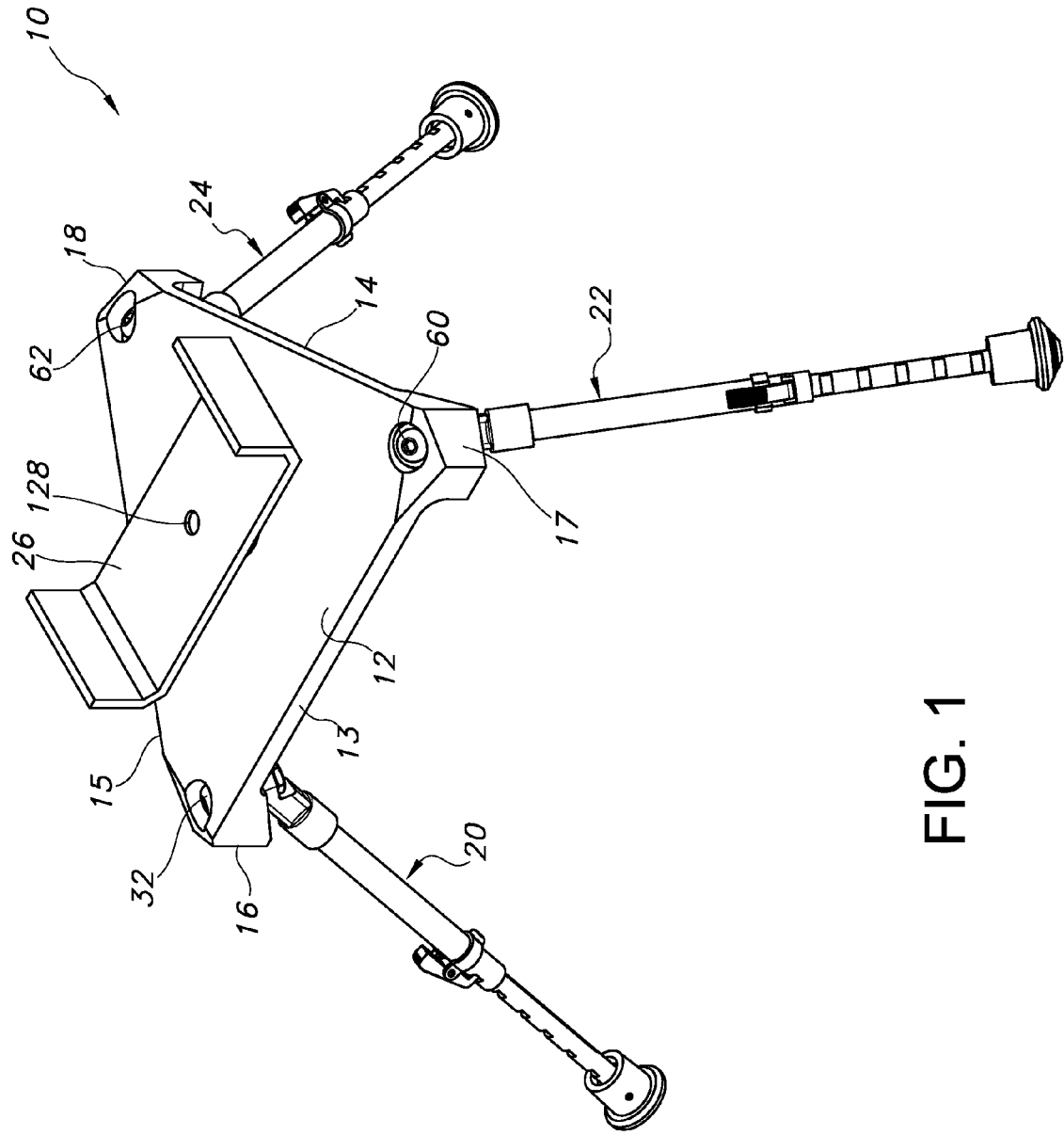
FIG. 1 is a top perspective view of the tripod assembly of the present invention with its telescoping support legs deployed to a support position and extended, and illustrating a first embodiment of a bench rest accessory mounted on the top of the tripod.

Turning now to a more detailed description of the invention, FIGS. 1-20 illustrate a tripod assembly 10 which incorporates a polygonal, planar top support plate, or base 12 having three sides 13, 14 and 15, preferably of substantially equal length to form a triangular support. The three sides converge to meet at truncated corners, or vertices, to form three downwardly extending shoulders 16, 17, and 18 to which are hingedly attached three corresponding support legs 20, 22, and 24.

Figure 2:
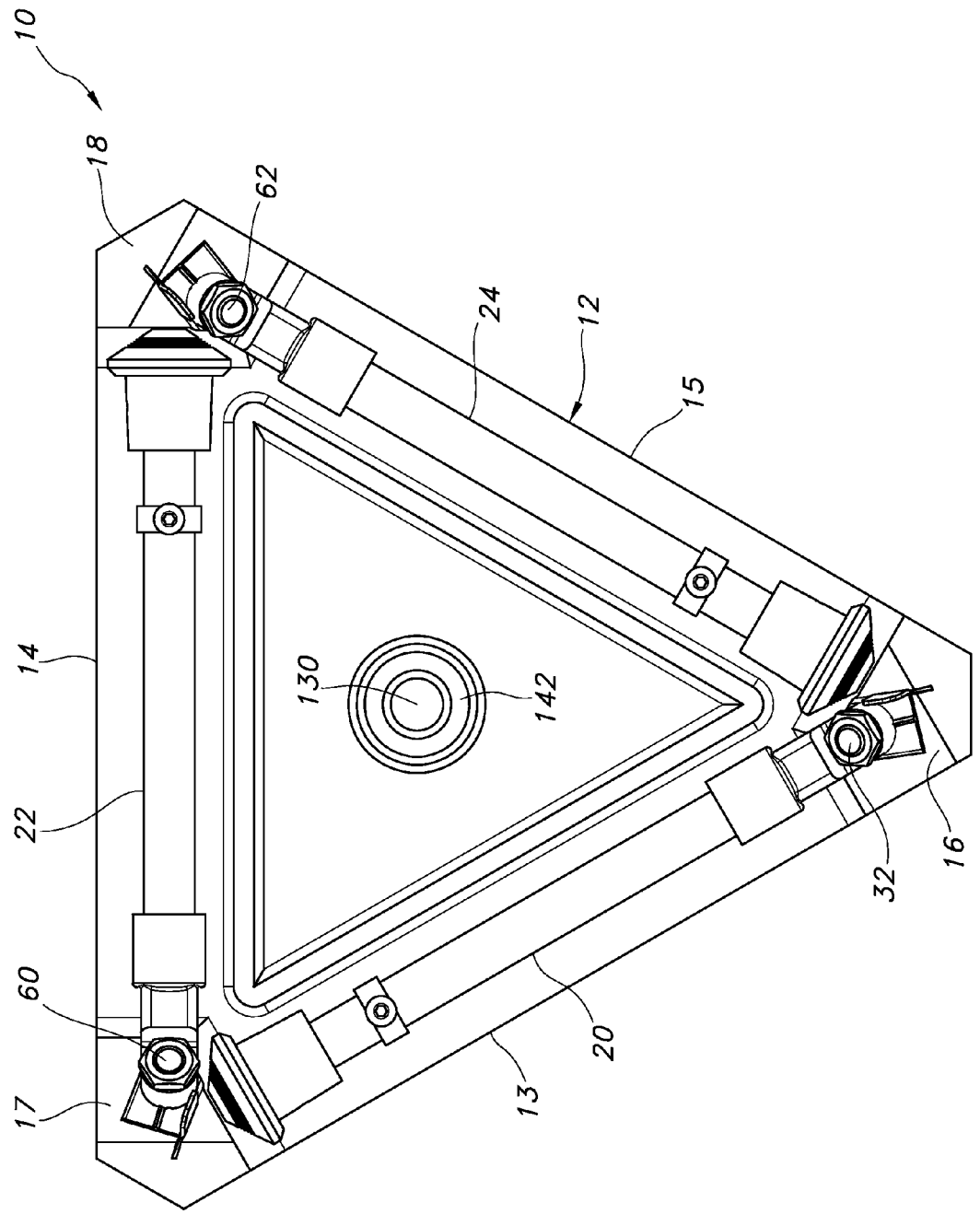
FIG. 2 is a bottom plan view of the tripod assembly of FIG. 1, illustrating the tripod legs in a non-extended, folded position.
Figure 3:
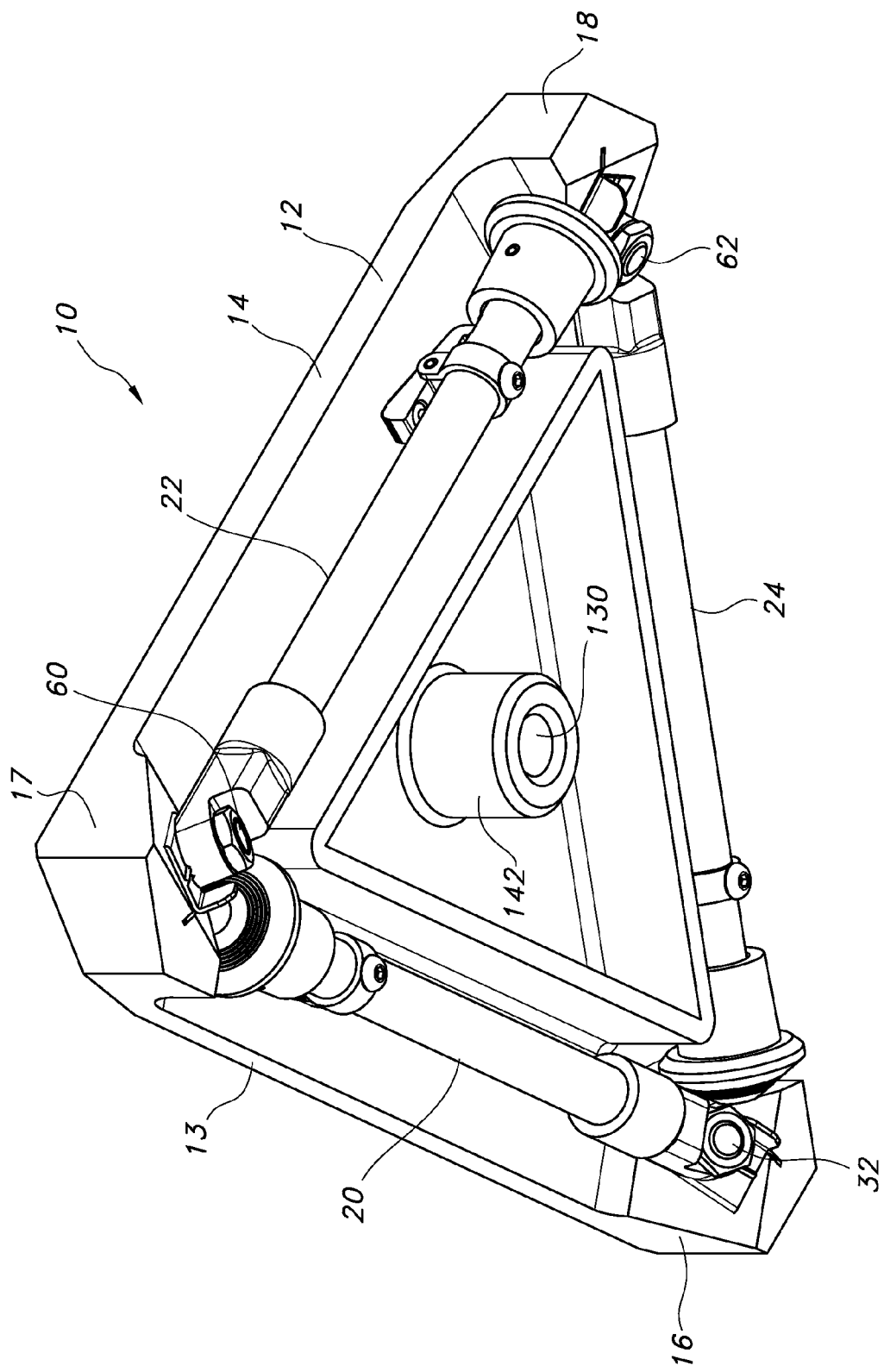
FIG. 3 is a bottom perspective view of the tripod assembly of FIG. 2.
Figure 4:
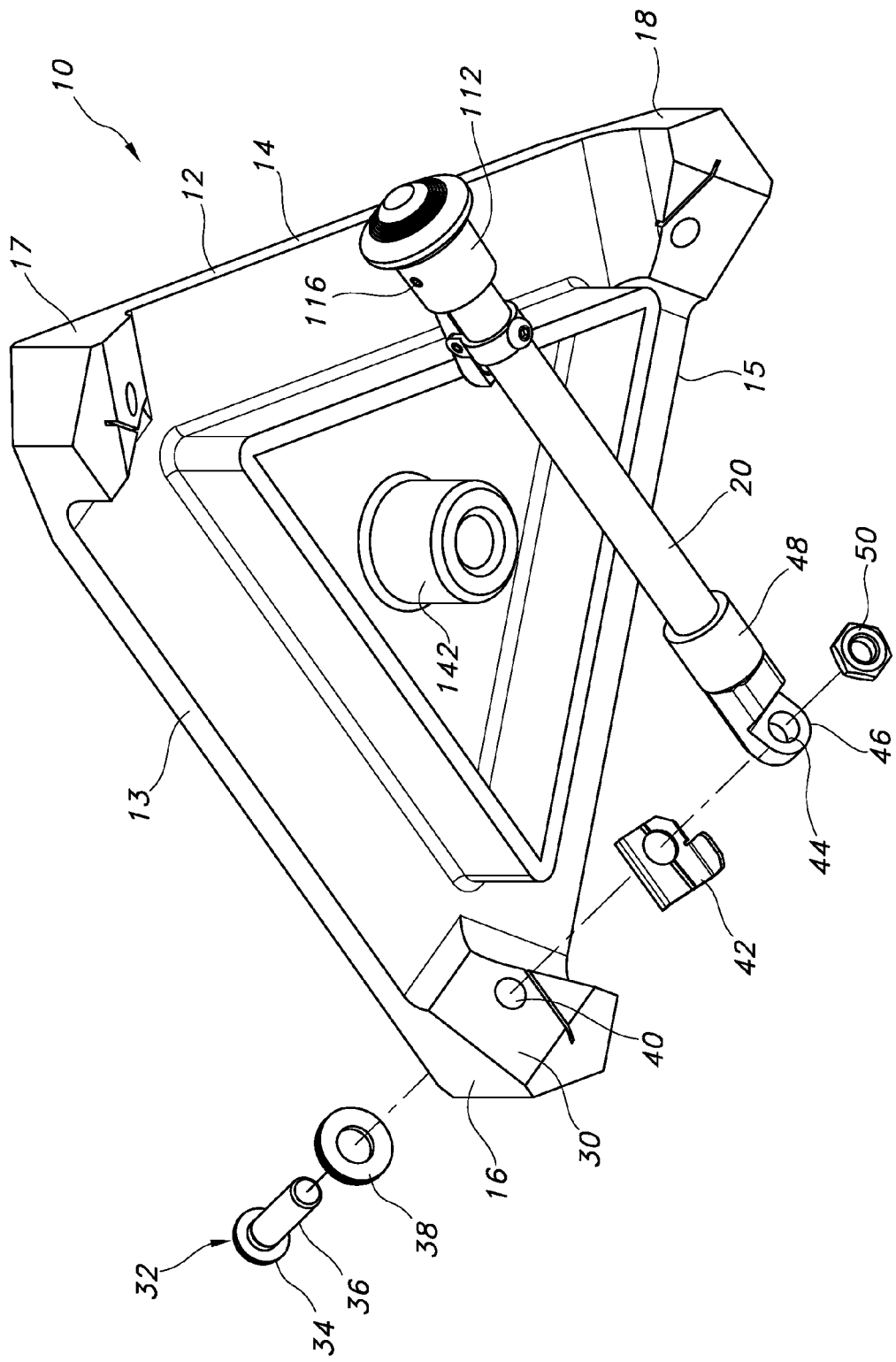
FIG. 4 is an exploded, partial view of the tripod assembly of FIG. 3.
Figure 8:
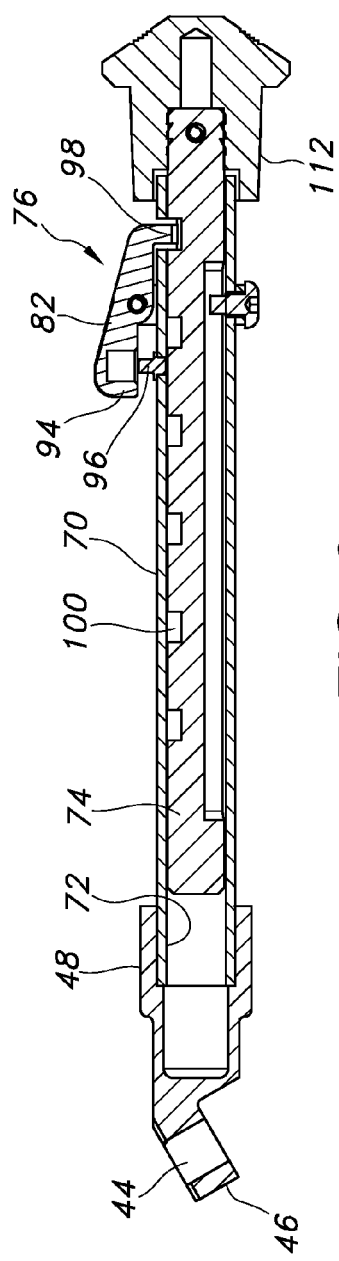
FIG. 8 is a cross-section of the telescoping leg of FIG. 5, taken along line 8-8 of FIG. 5.
Figure 7:
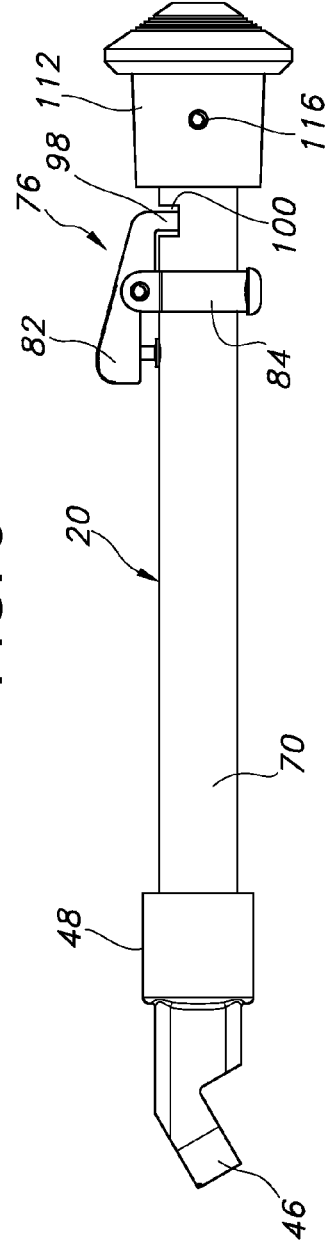
FIG. 7 is a side plan view of the telescoping leg of FIG. 5.
Figure 5:
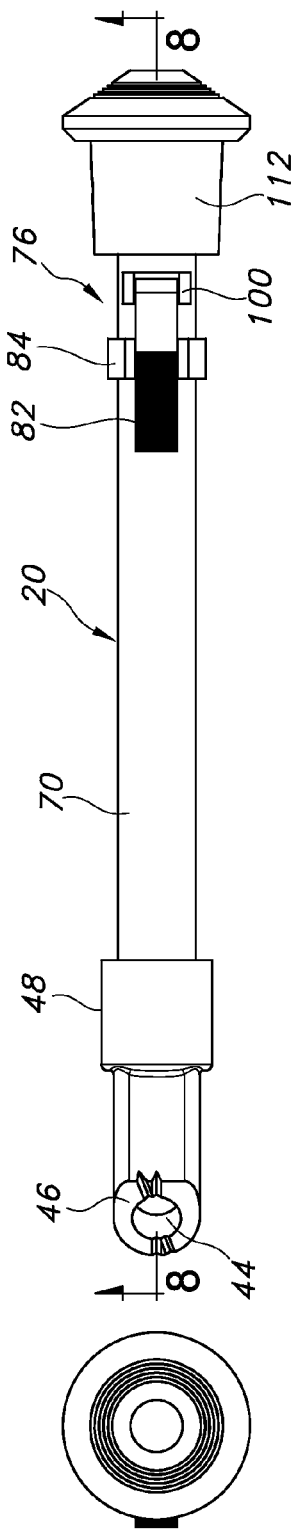
FIG. 5 is top plan view of the telescoping leg illustrated in the exploded view of FIG. 4.
Figure 6:
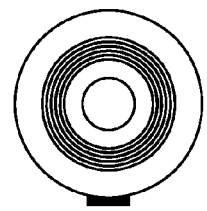
FIG. 6 is an end view of the telescoping leg of FIG. 5.
Figure 9:
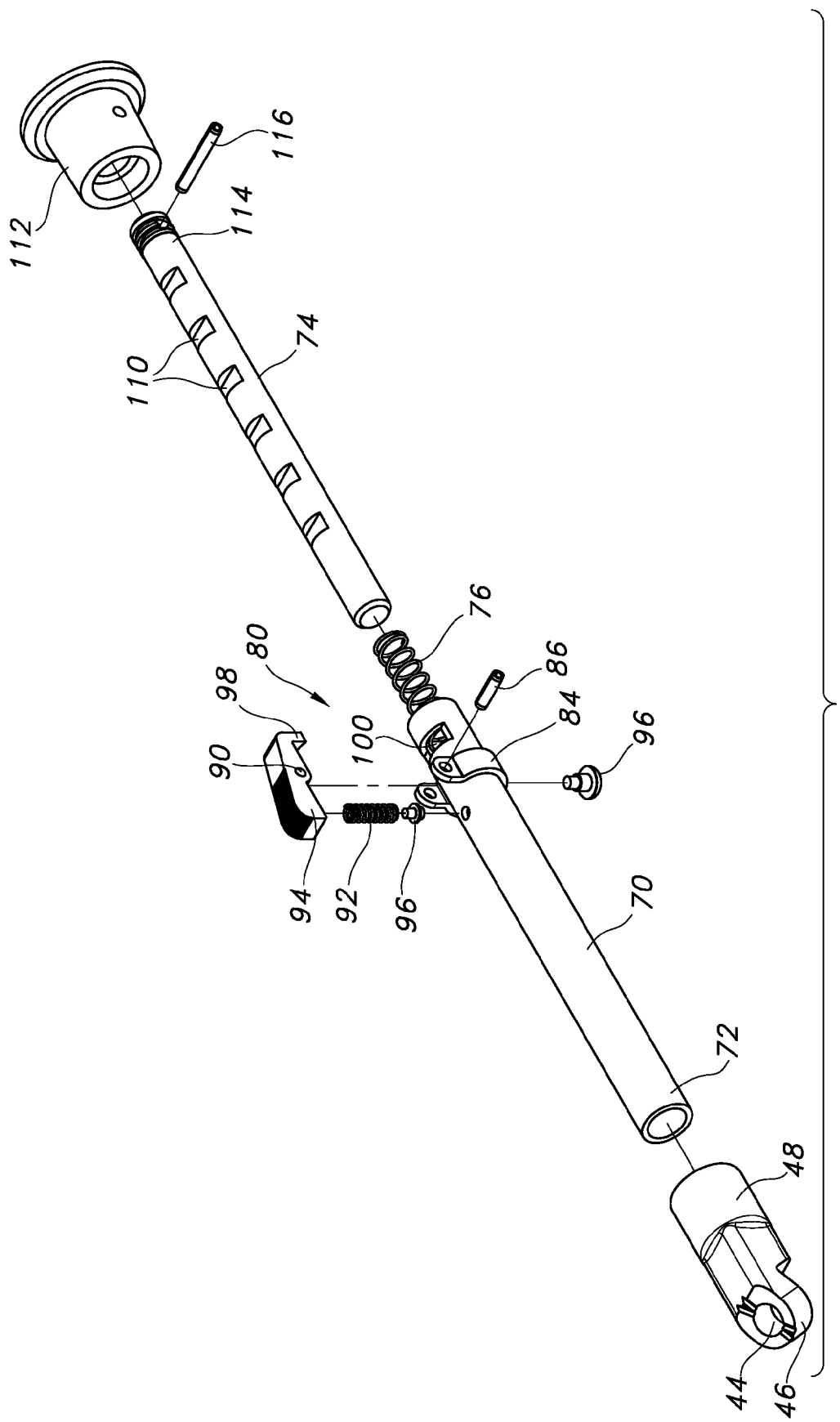
FIG. 9 is an exploded view of the telescoping leg of FIGS. 5-8.
Figure 11:
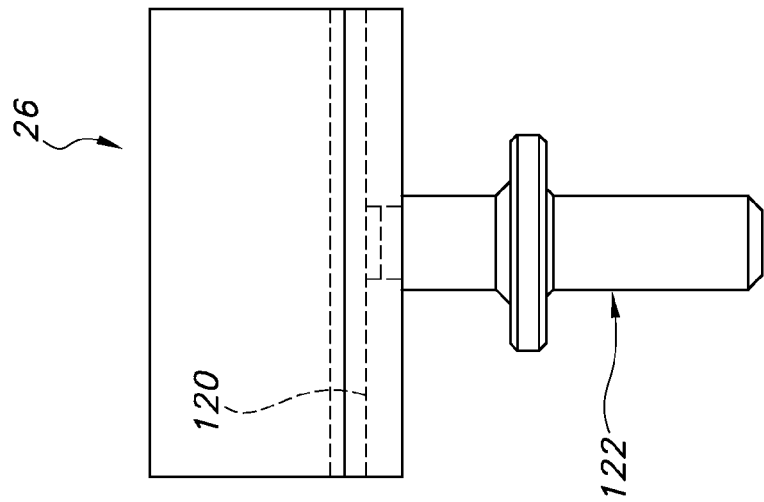
FIG. 11 is an end plan view of the mount accessory of FIG. 10.
Figure 10:
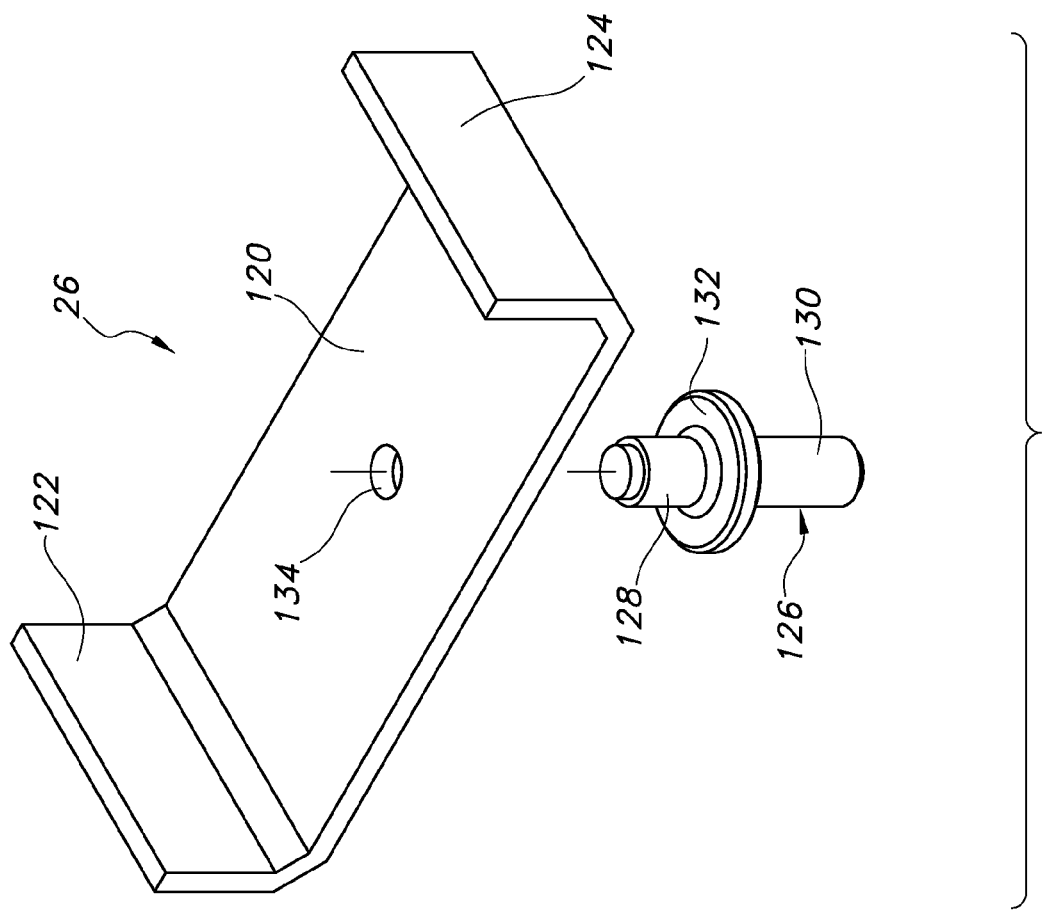
FIG. 10 is an exploded perspective view of the mount accessory illustrated in FIG. 1.

As illustrated in FIG. 1, accessory kit 26, here shown as a bench rest type mount, is secured to the top of the tripod assembly base, as will be described in greater detail hereinbelow. Each of the support legs 22 and 24 are substantially identical to leg 20, which is illustrated in FIG. 4 as being connected to an inner, downwardly and outwardly sloping surface 30 of shoulder 16 by a pivot pin 32 having a head 34 and a shaft 36 that extends through a Belleville spring washer 38, a bore 40 in the shoulder 14, a tabbed washer 42, and an aperture 44 in an end portion 46 of a leg cap 48, where it is secured by a nut 50. The nut secures an angled, flat surface of end portion 46 against the angled shoulder surface 30, to allow the leg to pivot about the axis of pin 32 between an extended position illustrated in FIG. 1 and a folded position parallel to base side 13 as illustrated in FIGS. 2 and 3, with the extended position being limited by the tabbed washer.

Legs 22 and 24 are similarly secured to pivot pins 60 and 62 secured to respective shoulders 16 and 18 to enable these legs also to pivot between their extended and folded positions parallel to base sides 14 and 15, respectively. When in the horizontal, non-supporting, or folded configuration, the three legs are retracted, and are carried by their hinge or pivot connections in an orientation with each leg's central axis aligned to be close to parallel with the planar base. Each leg is selectively and independently reconfigurable and positionable. The deployed position places each leg in a generally vertical orientation, with the angular orientation of each leg being controlled, preferably by a stop or tab incorporated into the leg's pivot, such as the tab in the tabbed washer which cooperates with a downwardly projecting step defined in the angled shoulders of the base.

As illustrated in FIGS. 5-9, leg 20 consists of an outer tube 70 to which the end cap 48 is secured at its inner, or proximal, end 72, and an inner tube 74 which is telescopically received into an inner opening at the far, or distal end of tube 70. An inner leg spring 76 is received in the tube 70 and engages the interior of cap 48 and the inner end of tube 74 to urge the tube 74 out of tube 70. A catch mechanism 80 for positioning the inner tube longitudinally within tube 70 includes a latch 82 secured to the outer surface of tube 70 by a catch bracket 84 around the tube and a spring-type latch pin 86 which passes through and is secured by apertures 88 in opposite ends of the catch bracket 84, and passes through an aperture 90 in the latch 82 to enable the latch to pivot on pin 86.

A biasing catch spring 92 is secured under one end 94 of latch 82 by a peg 96 affixed to tube 70 to urge latch 82 to pivot to cause a downwardly extending latch tooth 98 on latch 82 to pass through an aperture 100 in tube 70 to engage one of a plurality of lateral slots 110 spaced along the length of inner tube 74. The latch may be pivoted in a counter-clockwise direction (as viewed in FIGS. 7 and 8) to release the inner tube 74 to allow it to slide longitudinally with respect to outer tube 70. Releasing the latch allows spring 92 to pivot it in a clockwise direction (as viewed in FIGS. 7 and 8) to cause tooth 98 to engage a slot 110 to secure the telescoping tubes to form a leg of the desired length.

A foot 112, preferably of rubber, may be secured to the outer, or lower end 114 of leg 20 as by a spring-type straight pin 116 that passes through the foot and is secured in corresponding openings in the tube 74. Each of the legs 22 and 24 is similarly constructed and connected to the corresponding shoulders 17 and 18 of the tripod base 12.

The accessory 26 illustrated in FIG. 1 is one of three accessory kits that are illustrated herein for purposes of demonstrating the uses and the versatility of the tripod assembly 10. As illustrated in this Figure and in FIGS. 10 and 11, the bench rest type accessory kit 26 consists of a cushion supporting mount that includes a bag support plate 120 with upturned flanges 122 and 124 at opposite ends to form a U-shaped bench-rest style forearm support for use, for example, with a rifle that has no front mounting structure. The support plate 120 is affixed to the top of a mount coupling element which consists of a central support shaft 126 that is divided into upper and lower sections 128 and 130 by a circumferential flange 132. To position the support plate 120 on the tripod, the top section 128 of shaft 126 is affixed to the plate as by threading it into a plate aperture 134 (FIG. 10), and the bottom portion 130 of the shaft, which preferably is threaded, is secured in a central aperture 140 (FIG. 20) by a suitable fastener such as a threaded nut 142 (FIGS. 3 and 4). The flange 132 rests on the top surface of base plate 12 so as to space the support plate 120 above the tripod base, and the mount coupling is preferably secured by nut 142 so as to allow the support plate 120 to pivot about the axis of the support shaft 126, if desired.

Figure 12:
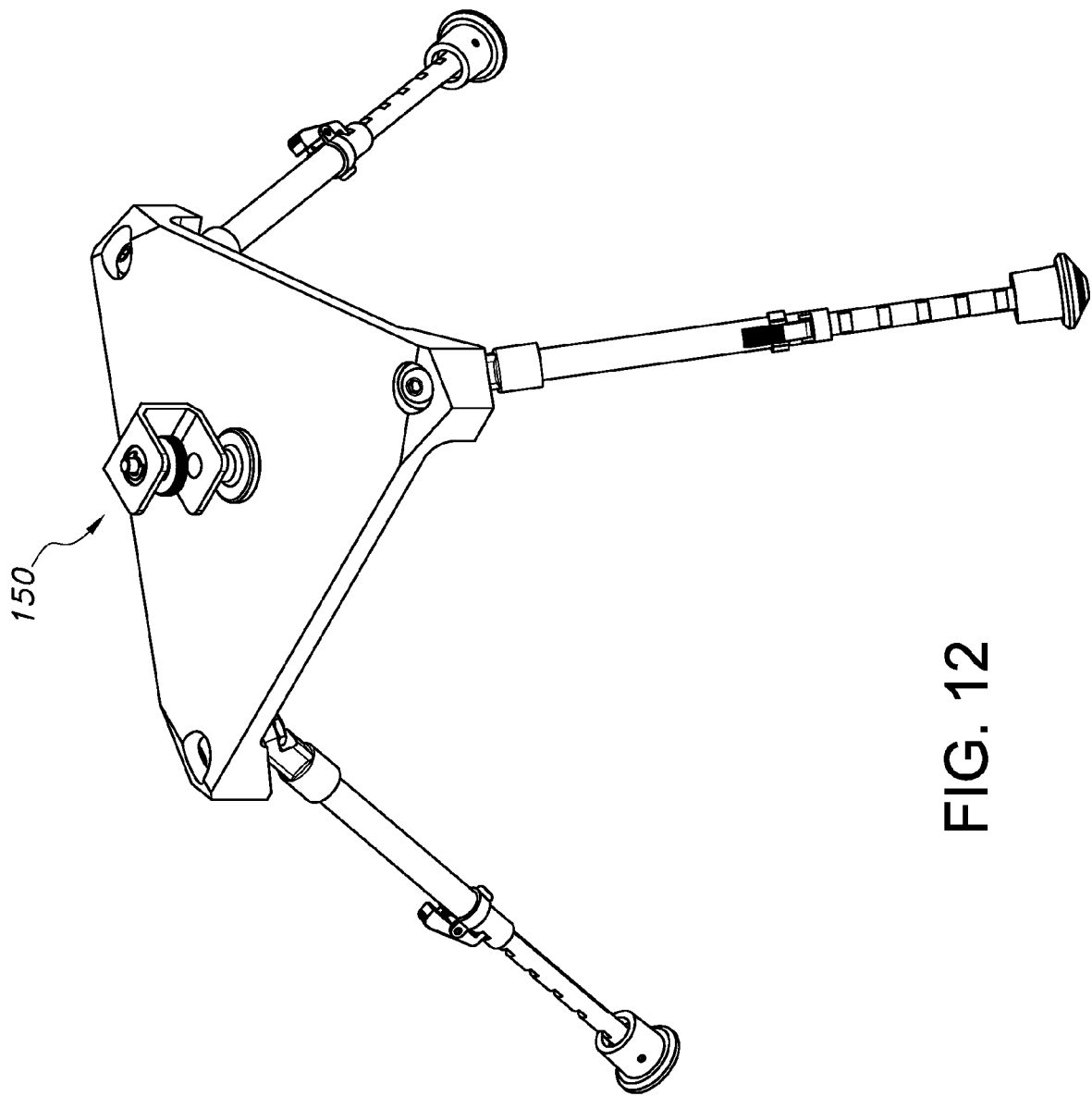
FIG. 12 is a top perspective view of the tripod assembly of the present invention with its telescoping support legs deployed to a support position and extended, and illustrating a second embodiment of an accessory, in this case a camera-style mount, secured on the top of the tripod.
Figure 15:
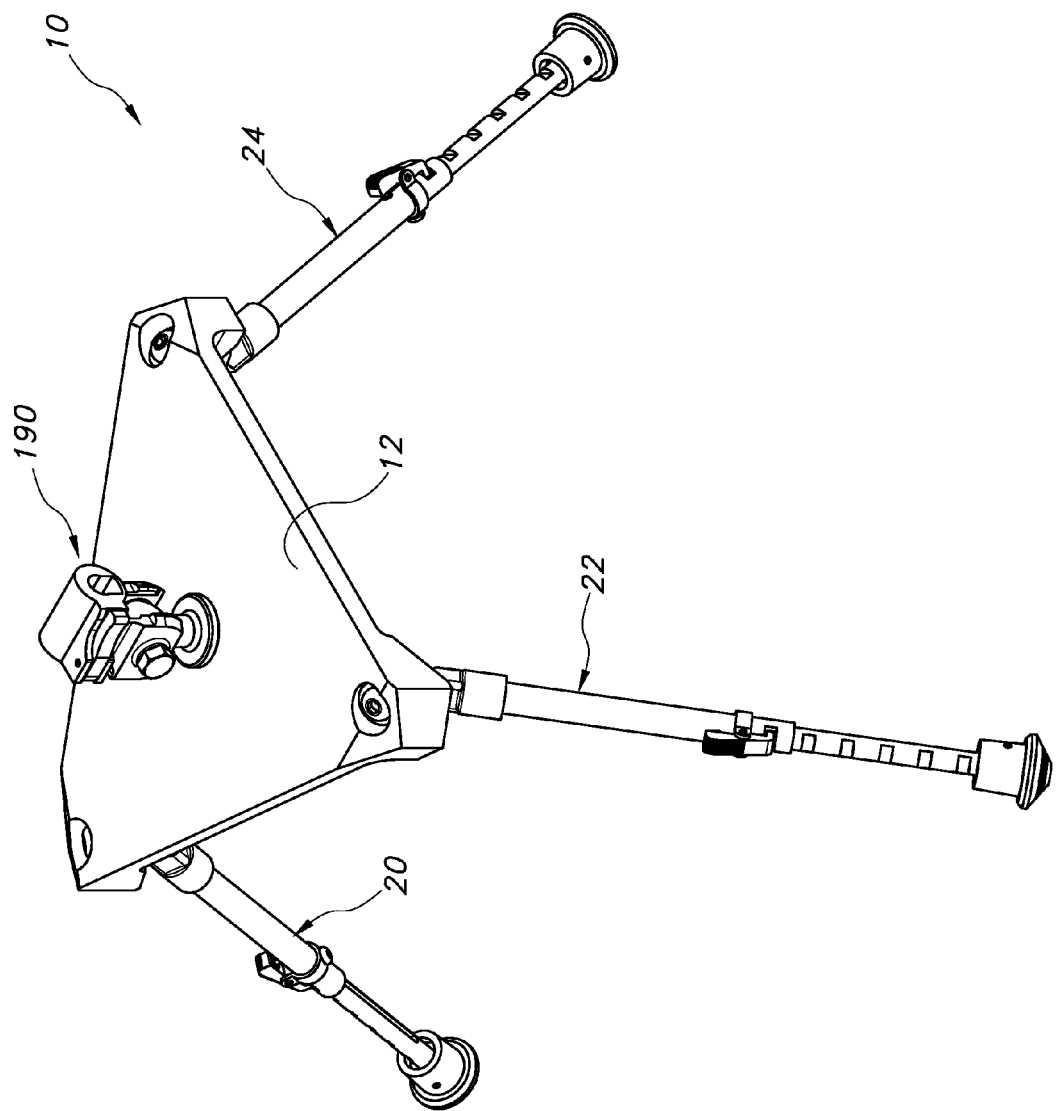
FIG. 15 is a top perspective view of the tripod assembly of the present invention with its telescoping support legs deployed to a support position and extended, and illustrating a third embodiment of an accessory, in this case a Versa-Pod style clamp, mounted on the top of the tripod.
Figure 18:
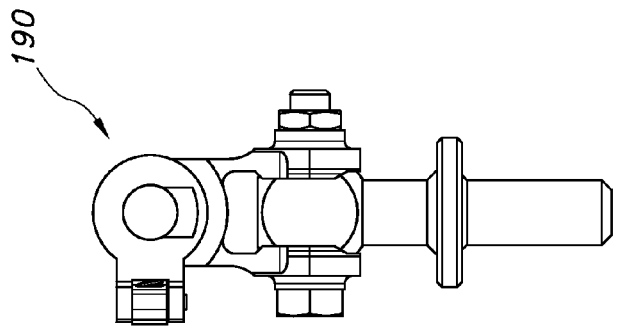
FIG. 18 is right-hand side view of the accessory of FIG. 15.
Figure 17:
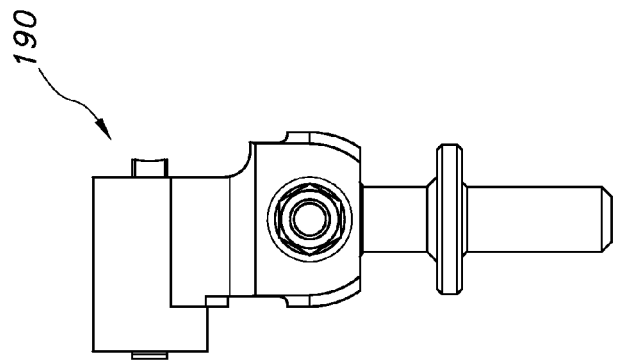
FIG. 17 is a left-hand end view of the accessory of FIG. 15.
Figure 19:
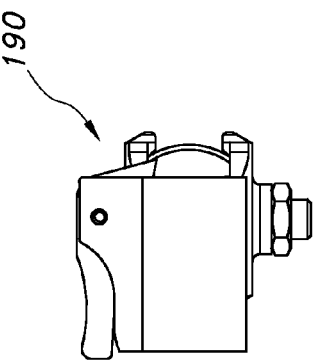
FIG. 19 is a top plan view of the accessory of FIG. 15.
Figure 16:
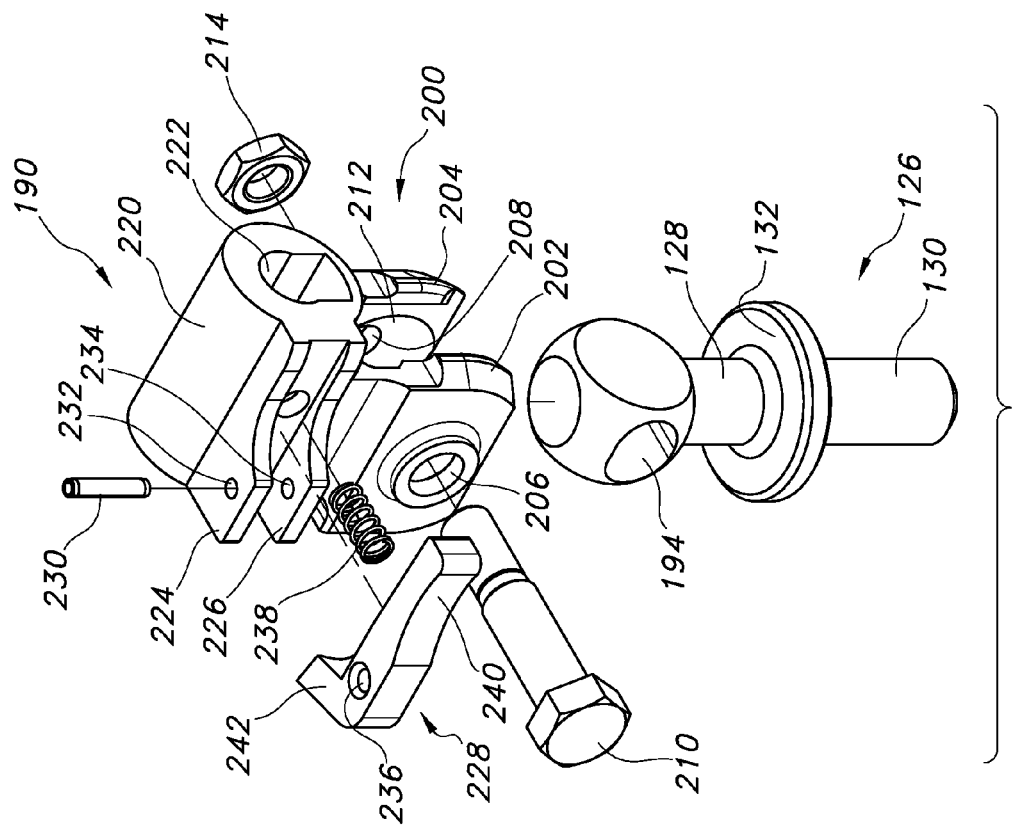
FIG. 16 is an exploded perspective view of the accessory of FIG. 15.

A second accessory kit for the tripod assembly 12 is illustrated in FIGS. 12, 13 and 14 as a camera-style mounting kit 150 consisting of a U-shaped mounting bracket 152 having a base 154 and upper and lower support legs 156 and 158. The upper leg incorporates an aperture for receiving a mounting screw 160 secured in an aperture 162 in the upper leg 156 by a C-shaped retaining washer 164 that snaps into a groove 166 in an upper, threaded portion 168 of the screw. The washer 164 rests in a shallow recess 170 in the top surface of leg 156 so that the threaded end 168 extends above the bracket arm 156 to engage correspondingly threaded bore in a device such as a camera, spotting scope or the like to be supported on the tripod assembly, as is conventional with standard camera-style mounts. The lower end of the screw 160 is enlarged to form a shoulder 172 which engages the bottom surface of leg 156 when a device is securely mounted on the bracket, and further incorporates a knurled head 174 for use in manually securing the screw.

Bracket 152 is mounted on the tripod base 12 by the mount coupling support shaft 126 described above with respect to FIGS. 10 and 11 for the bench rest support accessory kit 26. The upper threaded portion 128 of shaft 126 is secured in a threaded aperture 180 in the lower leg 158 of bracket 152, and the mounting accessory kit 150 is secured to the base plate 12 by passing the lower portion 130 of the shaft 126 through the central aperture 140 in the base plate 12 and securing it by a suitable fastener such as the nut 142.

A third exemplary accessory kit that may be mounted on the tripod assembly 10 is illustrated in FIGS. 15-19 as a Versa-Pod® style support, or clamping assembly 190, for use with instruments or firearms having a mount with a Versa-Pod® style spigot, such as that described in applicant's U.S. Pat. Nos. 5,711,103, 5,815,974, and 7,631,455. The clamping assembly kit 190 is mounted to the tripod assembly 10 by the mount coupling support shaft 126 described above. In this embodiment, the accessory kit includes a tripod ball 192 secured to the top end 128 of shaft 126, as by a threaded bore (not shown) in ball 192 that engages the upper threaded portion of shaft 126. The ball 192 incorporates a through aperture 194 that extends through the ball in a direction substantially perpendicular to the longitudinal axis of shaft 126.

Accessory kit or assembly 190 for the tripod assembly 10 incorporates a generally U-shaped lower mounting bracket 200 having depending legs 202 and 204 having respective apertures 206 and 208 aligned to receive a securing bolt 210. The inner surfaces of the legs 202 and 204 of the mounting bracket incorporate spherical depressions 212 surrounding the apertures 206 and 208, and these legs are spaced apart to receive the tripod ball 192 in the depressions. When the lower mounting bracket 200 is so positioned on ball 192, the apertures 206 and 208 are aligned with the through aperture 194 in the tripod ball. A bolt 210 passes through the aligned apertures and is secured by a suitable fastener such as a nut 214 to pivotally fasten the lower mounting bracket 200 to the tripod ball 192, to allow the bracket to be secured at a desired angle with respect to the axis of shaft 126.

Mounted on the top of bracket 200 is an upper, generally tubular spigot mount 200 having an axial receiver aperture 222 for receiving a Versa-Pod® style spigot. Mount 200 includes a pair of upper and lower bracket arms 224 and 226 spaced apart to receive a mounting latch 228. A spring-type straight pin 230 passes through corresponding apertures 232 and 234 in the upper and lower arms and an aperture 236 in the mounting latch to pivotally secure the latch to the spigot mount 220. A bias spring 238 is secured between an arm portion 240 of the mounting latch 228 and the spigot mount 220 to urge arm portion 240 away from the mount to cause tooth portion 242 of the mounting latch to pivot inwardly. The tooth portion is adapted to engage corresponding grooves on a Versa-Pod® style spigot, so that manual depression of the latch arm portion allows mounting of the clamp assembly 190 on the spigot. Once a device such as a firearm is secured to clamp assembly 190, and the clamp assembly is secured to the tripod assembly 12, the device may be pivoted about the perpendicular axes of the shaft 126 and the bolt 210.

Figure 20:
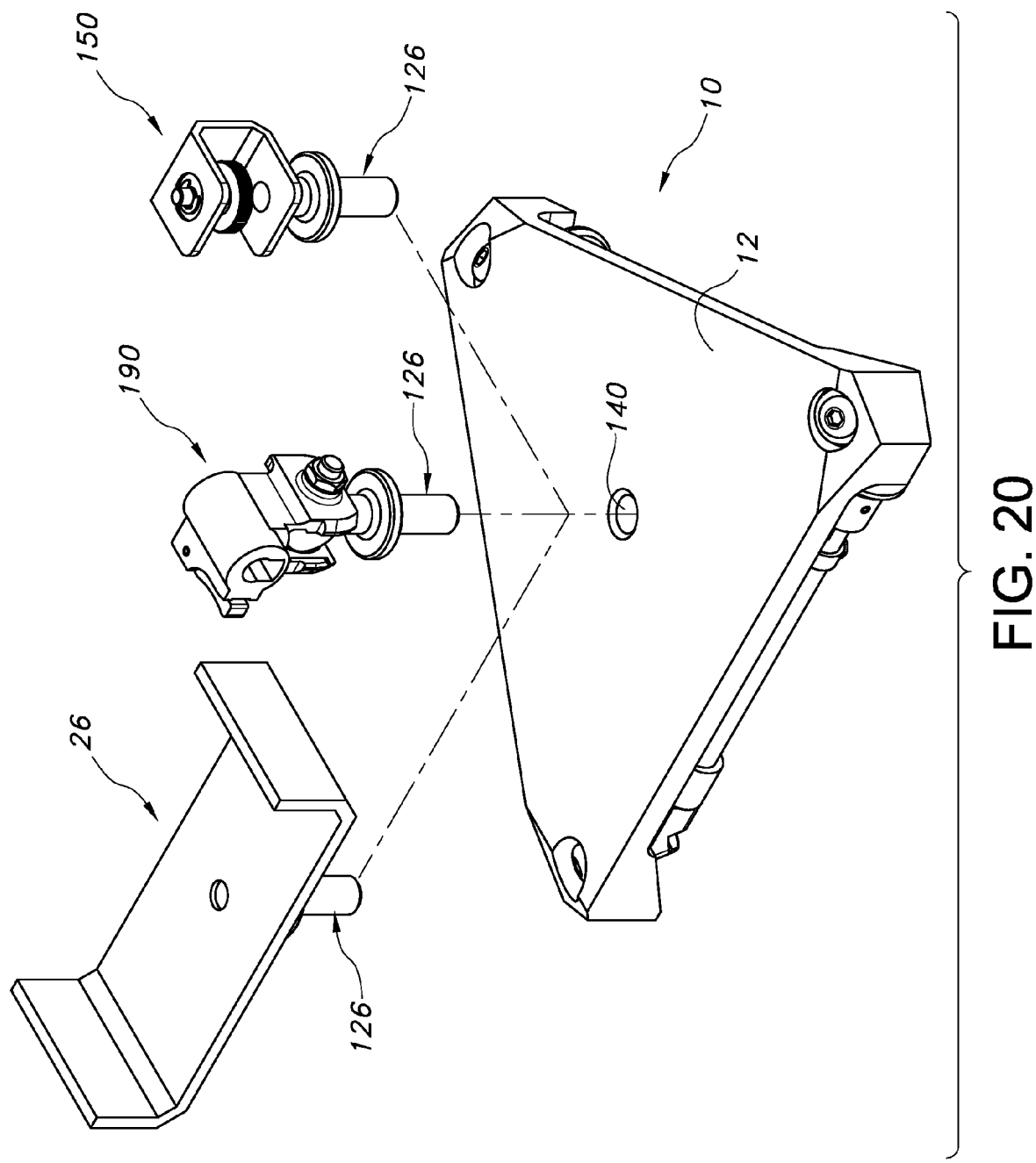
FIG. 20 illustrates in an exploded view the tripod assembly and three accessories that may be mounted on the tripod.

The three exemplary mounting accessories 26, 150, and 190 described above are all secured to the tripod assembly 10 by a mounting shaft such as the described shaft 126, and thus are interchangeable, as illustrated in FIG. 20. As described, these accessories include a bench-rest style forearm support 26, for use with a rifle that has no front mounting structure, a mounting coupler 150 including a knurled screw having a threaded shaft configured to engage the threaded bores incorporated in spotting scopes and cameras and now used as the industry standard tripod coupler for photography and the like, and a Versa-Pod® style clamping assembly 190, for use with instruments or firearms having a mount with a Versa-Pod® style spigot (e.g., as described in applicant's U.S. Pat. Nos. 5,711,103 and 5,815,974).

In the use of the present tripod assembly 10, the first, second and third legs can be pivoted from their horizontal, or folded carry position and deployed into a substantially vertical, supporting position, and the telescoping legs can optionally extended to position the tripod base at a desired height for supporting a device such as a camera, spotting scope, or firearm. The selected accessory may then be removably secured to the tripod assembly simply by inserting its associated support shaft 126 into the central aperture of the tripod base and securing it. For example, with the optional Versa-Pod® style clamp assembly 190 securely mounted to the tripod frame, a Versa-Pod® mount equipped instrument (e.g., forearm stock of a firearm), engages and is then securely supported and stabilized by the tripod assembly.

It will be understood that while the foregoing description relates to a preferred embodiment of the present invention, various modifications, additions and changes may be made thereto without departing from the spirit and scope of the invention. Further, it will be understood by those skilled in the art that while the present invention has been disclosed for use primarily with a tripod assembly for use with firearms, the present invention also can be used for supporting other types of instruments.

I claim:

1. A portable, releasable and collapsible tripod assembly and accessory kit, comprising:
    a substantially planar tripod base defining first, second and third vertices each having a downwardly and outwardly sloped shoulder portion;
    first, second and third tubular upper leg segments each having a proximal end cap pivotally attached to a corresponding sloped shoulder portion of said planar base for manual movement between a first, deployed, downwardly projecting tripod support position, wherein a deployed upper leg segment projects distally away from the plane of said base, and a second, folded state, wherein a folded upper leg segment is in substantial alignment with the plane of said base, and wherein each of said tubular, upper leg segments defines an interior lumen;
    first, second and third leg extension members each having a proximal end opposing a distal end and an exterior sidewall and being telescopically received within a corresponding one of said first, second and third tubular upper leg segments, and wherein each of said leg extension members carries a support foot at a distal end; and
    a tripod accessory comprising a mount coupling member dimensioned to receive a selected mount from a plurality of available accessory mounts, said mount coupling member being removably securable to the tripod base.

2. The portable, releasable and collapsible tripod assembly and accessory kit of claim 1, wherein said mount coupling member comprises a mounting shaft having an upper end securable to an accessory mount and a lower end removably securable to said base through an aperture in said base.

3. The portable, releasable and collapsible tripod assembly and accessory kit of claim 1, said tripod accessory further comprising:
    a cushion supporting mount including a bag support plate securable to said mount coupling member.

4. The portable, releasable and collapsible tripod assembly and accessory kit of claim 1, said tripod accessory kit further comprising a Versa-Pod® style mount including:
    a tripod ball mountable on said mount coupling member;
    a lower bracket pivotally mounted on said ball; and
    an upper, generally tubular spigot mount having an axial, receiver aperture for receiving a Versa-Pod® style spigot.

5. The portable, releasable and collapsible tripod assembly and accessory kit of claim 4, wherein said tripod base is substantially triangular, having three sides meeting at said vertices, and wherein said tripod legs are pivotally secured to respective shoulders at said vertices by corresponding pivot pins.

6. The portable, releasable and collapsible tripod assembly and accessory kit of claim 5, wherein the proximal end cap of each leg incorporates an angled surface which engages the inner sloped surface of its corresponding shoulder portion when said leg is pivotally attached to a corresponding sloped shoulder portion of said planar base by a pivot pin.

7. The portable, releasable and collapsible tripod assembly and accessory kit of claim 6, further including a pivot stop for each leg.

8. The portable, releasable and collapsible tripod assembly and accessory kit of claim 7, further including a length adjustment latch for each leg.

9. The portable, releasable and collapsible tripod assembly and accessory kit of claim 1, said tripod accessory kit further comprising a camera-style mount incorporating:
    a bracket securable to an upper end of said mount coupling member; and
    a threaded camera mounting shaft secured in said bracket.

10. The portable, releasable and collapsible tripod assembly and accessory kit of claim 1, wherein said mount coupling member comprises a mounting shaft having a lower end removably securable to said base through an aperture in said base and an upper end securable to an accessory mount selected from a plurality of available accessory mounts, comprising:
    a cushion rest accessory mount securable to the upper end of said mounting shaft;
    a camera-style accessory mount having a bracket securable to the upper end of said mounting shaft; or
    a Versa-Pod® style accessory mount securable to a tripod ball mounted on the upper end of said mounting shaft.

* * * * *